United States Patent [19]
Mason

[11] Patent Number: 5,212,418
[45] Date of Patent: May 18, 1993

[54] HIGH TORQUE AND SPEED DC MOTORS

[76] Inventor: Elmer B. Mason, 905 Vickie Dr., Del City, Okla. 73115

[21] Appl. No.: 870,861

[22] Filed: Apr. 20, 1992

[51] Int. Cl.⁵ .......................................... H02K 16/02
[52] U.S. Cl. .................................... 310/114; 310/112
[58] Field of Search ............. 310/114, 112, 124, 154, 310/40.5, 40 MM, 126; 318/5

[56] References Cited

U.S. PATENT DOCUMENTS

| | | | |
|---|---|---|---|
| 881,585 | 3/1908 | Hopkinson et al. | 310/112 |
| 3,651,355 | 3/1972 | Mason | 310/112 |
| 3,717,780 | 2/1973 | Hohne, Jr. et al. | 310/112 |
| 3,863,084 | 1/1975 | Hasebe | 310/126 |
| 4,316,099 | 2/1982 | Mason | 310/154 |
| 4,316,109 | 2/1983 | Mason | 310/114 |

Primary Examiner—Steven L. Stephan
Assistant Examiner—Ed To
Attorney, Agent, or Firm—Robert K. Rhea

[57] ABSTRACT

A direct current motor having a plurality of armatures supported between magnetic pole pieces energized by direct current through one or more iron core coils interposed between the magnetic pole pieces. Wiring and electrical current controls connect a DC source to the coil or coils and armatures for selectively operating the armatures at a predetermined rpm and providing a selected torque with a minimum of ampere drain from the DC source.

8 Claims, 7 Drawing Sheets

FIG. 26

HIGH TORQUE AND SPEED DC MOTORS

BACKGROUND OF THE INVENTION

1. Field of the Invention

This invention relates to direct current motors and more particularly to multi-armature motors having dual coils between parallel pole pieces establishing magnetic circuits for exciting two or more armatures.

Conventional direct current motors usually comprise a housing journalling an armature with sectional field coils or stator windings contained by the housing which substantially surround the armature to provide a magnetic circuit for exciting the armature.

In this type of design only one armature is operated by each group of stators or field windings resulting in inefficient utilization of the various circuits established and thus limiting the potential of the magnetic circuit easily established by direct current through coils interposed between magnetizable pole pieces.

The number of rotors which may be interposed between and operated by the magnetic flux of two pole pieces established by one or more coils from a single direct current source is almost unlimited as disclosed by this invention.

2. Description of the Prior Art

The most pertinent patents are believed to be my U.S. Pat. No. 3,651,355 issued to me on Mar. 21, 1972 for Multi-armature Motors and U.S. Pat. Nos. 4,316,099 and 4,316,109 issued to me on Feb. 16, 1982 for Permanent Magnet Stator For D.C. Motors and Stator For Multi-Rotor D.C. Magnetic Motors, respectively.

My U.S. Pat. No. 3,651,355 discloses the basic features of the motors of this invention, but fails to disclose all the advantages of magnetic flux in selectively obtaining desired torque and speed of the respective armature with relation an efficient use of input amperage as disclosed by this invention.

The other two of my above named patents (U.S. Pat. No. 4,316,099 and U.S. Pat. No. 4,316,109) disclose one of the essential features of this invention, namely, the dimension of the respective pole piece arc in relation to the winding span of the respective armature and each disclose concentric armature rotating motors for a specific purpose.

SUMMARY OF THE INVENTION

Direct current motors are formed by armatures interposed between parallel opposite polarity pole pieces magnetized by a plurality of coils wound on cores extending between the pole pieces and energized by direct current from a source.

Wiring and substantially conventional electrical controls connecting a direct current source with the coils and armatures are selectively operated resulting in motors formed by respective armatures having high speed, high torque, low amperage input or low speed, low torque motors in which the direction of rotation is easily reversed by changing the direction of current through the commutators, one or more coils or the position of brushes on the commutators of the respective armatures.

The principal object of this invention is to provide a series of direct current motors and/or generators which find high utilization in industry and for tools and appliance operation for nonindustrial users.

DESCRIPTION OF THE PREFERRED EMBODIMENTS

Like characters of reference designate like parts in those figures of the drawings in which they occur.

Figure 1:
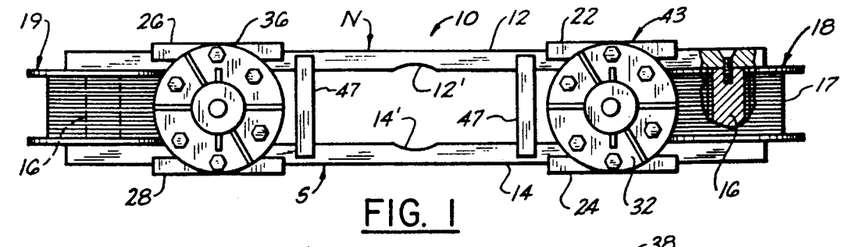
FIG. 1 is a side elevational of one embodiment of a two armature DC motor.
Figure 2:
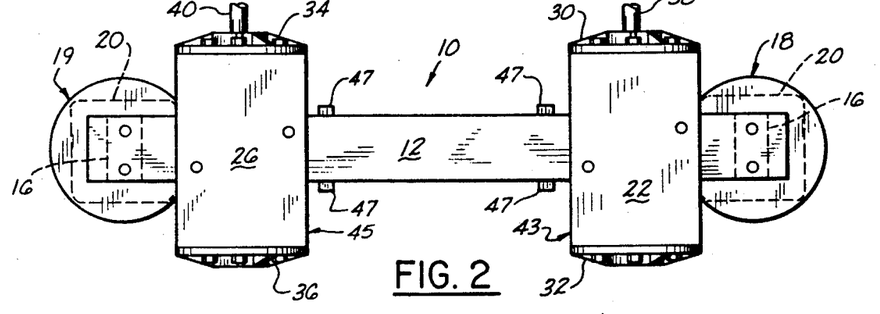
FIG. 2 is a top view of the motor of FIG. 1.

In the drawings:

Referring first to FIGS. 1 and 2, the reference numeral 10 indicates a dual armature direct current electric motor formed in accordance with this invention.

The motor 10 comprises a pair of strap-like elongated spaced-apart magnetizable pole pieces 12 and 14 interconnected adjacent their respective end portions by rectangular coil cores 16.

A wire 17 is wrapped around each coil core 16 to form a pair of coils 18 and 19 substantially rectangular when viewed from either end of the respective coil, as indicated by the dotted lines 20 (FIG. 2) for the reasons more fully explained hereinbelow. Obviously a plurality of wires of the same or different gauge may be simultaneously wound in-hand around the respective coil core for saturating the pole pieces with a selected flux density for armature speed control. This feature substantially eliminates the necessity of resistors in the control circuit.

When energized in the same direction by electric DC potential, as presently explained, the coils 18 and 19 form north N and south S magnetic pole pieces of the respective members 12 and 14.

Two pairs of rectangular diamagnetic material motor housing plates 22-24 and 26-28 are transversely secured in cooperating parallel opposition to the outer surfaces of the magnetic pole pieces 12 and 14 adjacent the respective coil 18 and 19.

Bearing equipped pairs of motor circular housing end plates 30-32 and 34-36 are respectively secured to the respective end portions of the pairs of plates 22-24 and 26-28 and journal the respective armature shaft 38 and 40 of the pair of armatures 42 and 44 (illustrated fragmentarily by FIG. 4) and define motor assemblies 43 and 45, respectively.

Figure 7:
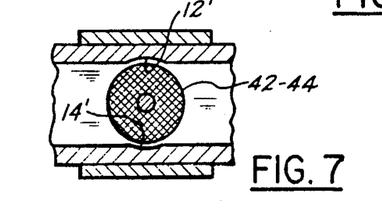
FIG. 7 is a vertical cross sectional view taken substantially along the line 7—7 of FIG. 6.
Figure 8:
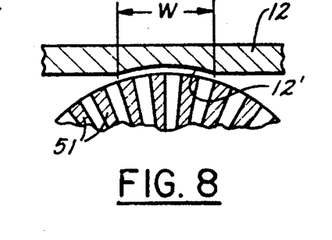
FIG. 8 is a fragmentary vertical cross sectional view, to a larger scale, similar to FIG. 7, illustrating the relationship of one magnetic pole piece relative to the periphery of an armature winding.
Figure 11:
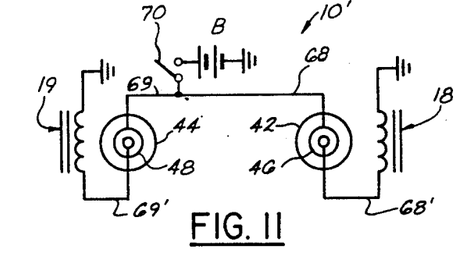
FIGS. 11 and 12 are wiring diagrams of the motor illustrated by FIGS. 1 and 2.

Referring also to FIGS. 7 and 8, the armatures 42 and 44 are of the conventional slotted type, each having a commutator 46 and 48, respectively, diagrammatically illustrated by FIG. 11. The diameter of the respective armature 42 and 44 is slightly greater than the spacing between the magnetic pole pieces 12 and 14 for the reasons which will now be explained.

The magnetic pole pieces 12 and 14 are provided with transverse confronting concave recesses 12' and 14' (FIG. 1) which are cooperatively positioned in axial alignment with the respective armature 42 and 44, and as illustrated by FIG. 7.

The preferred spacing between the periphery of the armature and the surface of the concave recess 12' is 0.020"+0.005" (0.05 cm +0.01 cm). The transverse width (W) (FIG. 8) of the magnetic pole recess 21' is preferably one-half the winding span of the respective armature. Stated another way, the recess width (W) is equal to the circumferential arc spanning three and one-half segments 51 of a span seven armature.

The width W of the recess 21' relative to the span of the armature is critical for the reason this width relation results in utilizing the favorable armature driving magnetic flux of the respective polarity which is concentrated in the respective recess from opposing directions in the respective pole piece without magnetic flux in the respective pole piece adjacent the recess 12' acting as a counter force on the segments of the armature in opposition to its direction of rotation. This greatly improves the torque and speed of a direct current motor as well as minimizing amperage drag on a direct current source by eliminating magnetic counter force acting on the armature.

The ease with which the operating characteristics of these motors may be changed, such as torque, speed or reversing as well as low amperage drag, through electrical controls, render these motors particularly useful in industry.

Figure 3:
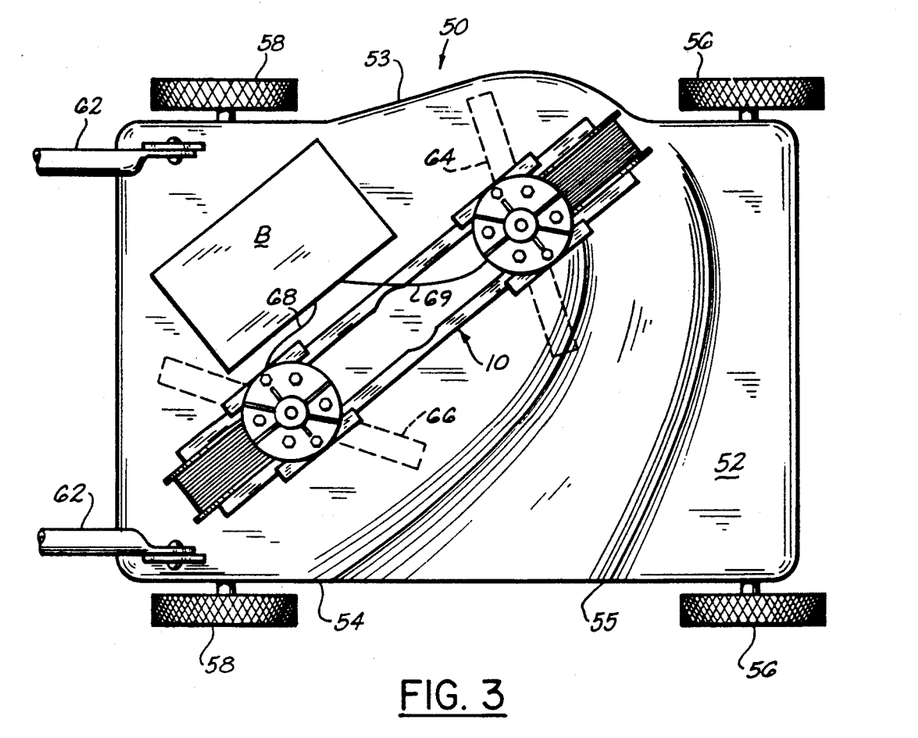
FIG. 3 is a fragmentary top view of the lawn mower having the motor of FIGS. 1 and 2 mounted thereon in operative position.
Figure 4:
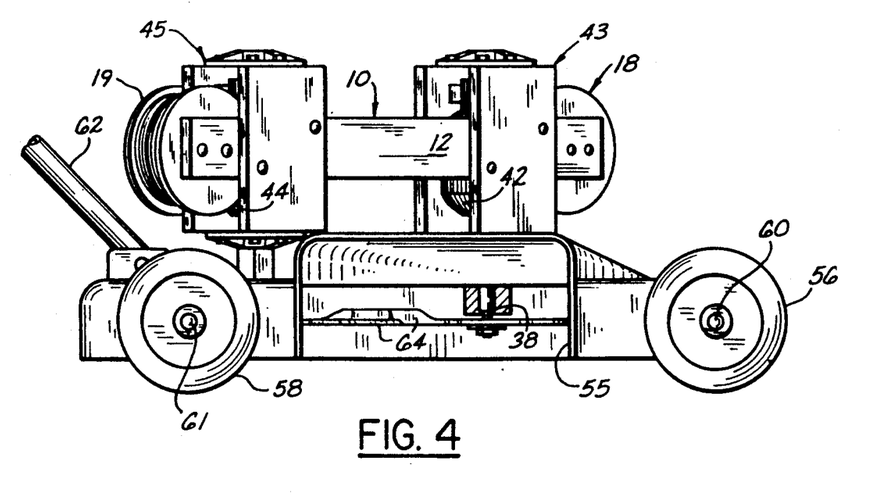
FIG. 4 is a side elevational view.

By way of example, FIGS. 3 and 4 illustrate the motor 10 mounted on and operating a residential-type lawn mower 50.

The lawn mower 50 comprises a housing, preferably formed from diamagnetic material such as fiber glass, having a generally horizontal platform top surface 52 and downwardly depending side walls 53 and 54.

The side wall 54 is provided with a cut-grass exhaust opening 55 and the side walls 53 and 54 respectively support forward and rearward pairs of outboard wheels 56 and 58 on axles 60 and 61, respectively. A handle, shown fragmentarily at 62, connected with the rearward portion of the platform 52 permits the operator to manually push and guide the lawn mower 50.

The motor 10 is mounted on the mower platform 52 by extending the armature shafts 38 and 40 downwardly through suitable apertures formed in the mower platform 52 and connecting the respective shaft armature with conventional mower blades 64 and 66. A battery pack B, such as two series connected 12 volt DC lead acid batteries, (FIG. 3) is conveniently mounted on the mower platform 52 and wires 68 and 69 connect the potential of the battery to the motor 10 through conventional electric controls, not shown, mounted on the handle 62 including an off-on switch 70 (FIG. 11).

Referring also to FIG. 11, for mowing most vegetation with a residential-type lawn mower, the wires 68 and 69 are respectively connected to ground in series through the commutators 46 and 48, of the armatures 42 and 44, and one end of the respective coil 18 and 19 by wires 68' and 69'.

Armature rpm and mower blades with this wiring was 3800. In order to comply with the governmental regulations of mower blades rpm not exceeding 3600 a shunt 47 comprising a selected length of strap metal magnetizable iron is placed in contact across the respective pole piece 12 and 14 adjacent the respective motor assembly 43 and 45 which reduces the rpm of the armatures and mower blades to 3600 rpm.

Under excessive load the armature rpm decreases and may stall for a relatively long period of time without an increase in battery drain or overheating of the armature.

As an example of the efficiency of the motor 10, when running free, from the potential of the 24 volt DC the amperage consumed was 10, with the motor under load as when cutting grass the average amperage drag was 15, with the motor driving a 22 inch blade, 10-20 amps were consumed in accordance with the load encountered by the blades. The average time duration of the battery pack B was one and one half hours, when the voltage had decreased to 14 volts with the motor still operating the lawn mower and the noise level was close to zero decibels.

As a comparison with conventional electric motor driven lawn mowers utilizing a sixteen inch blade and the same battery pack, the duration or life of the battery averaged 20 minutes with the motor consuming 50-60 amps.

Figure 12:
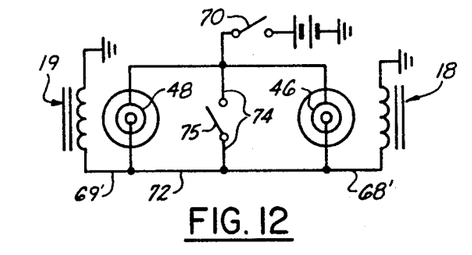

In the event dense vegetation is encountered when using the mower 50 and additional torque is needed for powering the mower blades, additional wiring (FIG. 12) is added to the wiring diagram of FIG. 11 comprising a wire 72 connected with the wires 68' and 69' and to the "on-off" switch armature 70 by a wire 74 having a power switch 75 interposed therein. Closing the power switch 75 substantially increases the torque of both armatures 42 and 44 by applying battery potential directly to the coils 18 and 19, thus increasing the magnetic flux in the pole pieces 12 and 14, and doubling the armature torque, rpm and amperage drag on the battery B. To obviate the increase of amperes a conventional pulse wave modulator, not shown, is interposed in the controls.

Figure 13:
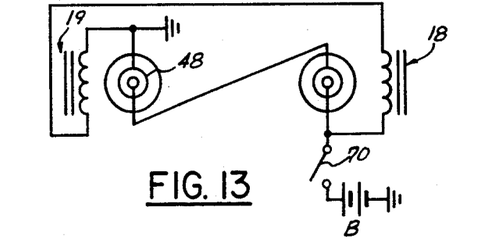
FIGS. 13 through 18 are wiring diagrams for desired operating characteristics of a two armature two coil DC motor.

FIG. 13 illustrates the potential of the battery B connected to ground in series through the commutators 46 and 48 of the armatures 42 and 44, respectively, and to ground in series through the coils 18 and 19. This wiring reduces the magnetic flux density in the pole pieces 12 and 14 which doubles the speed of both armatures 42 and 44.

Figure 14:
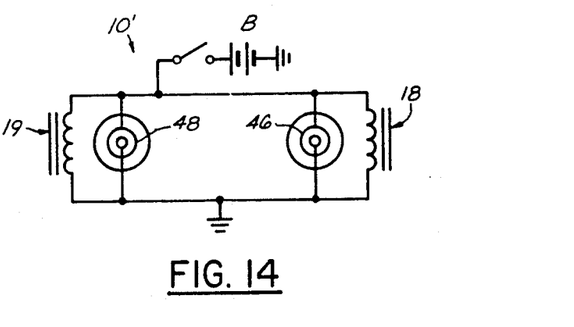

As illustrated by FIG. 14, connecting the battery potential to ground in parallel through the coil 18 and the commutator 46 and to ground in parallel through the coil 19 and the commutator 48 results in high speed armatures having high torque but also requires a greater amperage input.

Figure 15:
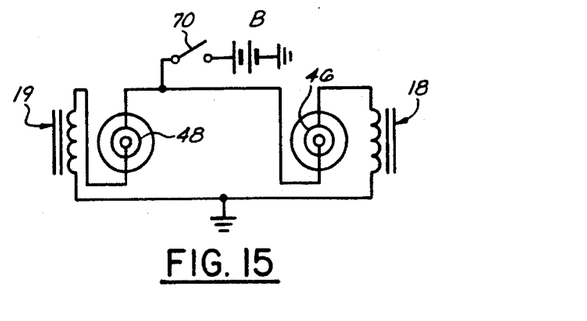

As illustrated by FIG. 15, connecting the battery potential to ground in parallel with the respective armature 46 and 48 in series with the respective adjacent coil 18 and 19 results in a low amperage drag and a decrease in torque.

Figure 16:
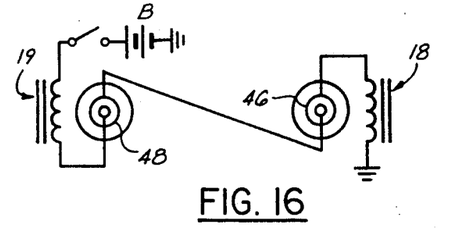

Connecting the battery potential in series through the coil 19 the commutators 46 and 48 and coil 18 to ground (FIG. 16) results in low speed armatures having low torque but requiring a minimum of amperage from the battery.

Figure 17:
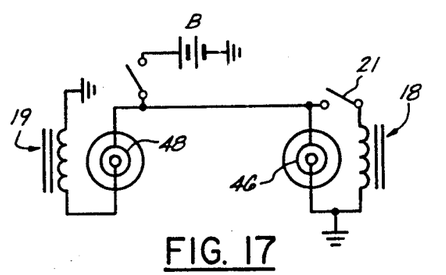

In FIG. 17 the battery potential is connected to ground in parallel through the commutator 46 and coil 18 and is separately connected to ground through the commutator 48 in series with the coil 19. A switch 21 in the positive wire energizes the coil 18 to decrease armature rpm. As will presently be apparent, any desired number of motors assemblies can be interposed between the outward coils 18 and 19, space permitting, and operated by the magnetic flux from one or both coils. Similarly, the position of the coils and armatures may be reversed as will presently be apparent.

Figure 18:
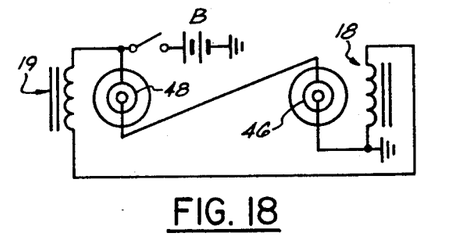

FIG. 18 illustrates the battery potential connected to ground in series through the commutators and to ground in series through the coils 18 and 19 results in doubling the armature rpm, low amperes requirement in free run with ampere drag increasing with load.

Figure 5:
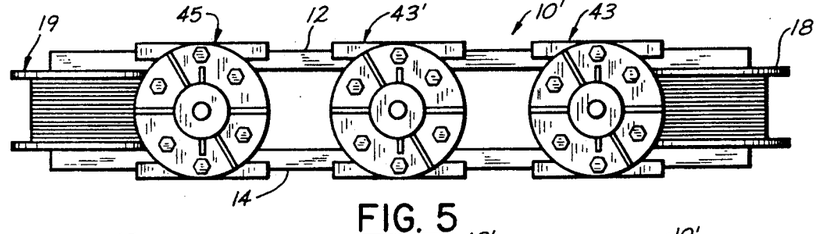
FIGS. 5 and 6 are views similar to FIGS. 1 and 2, respectively, having a third armature interposed between the two armatures.
Figure 6:
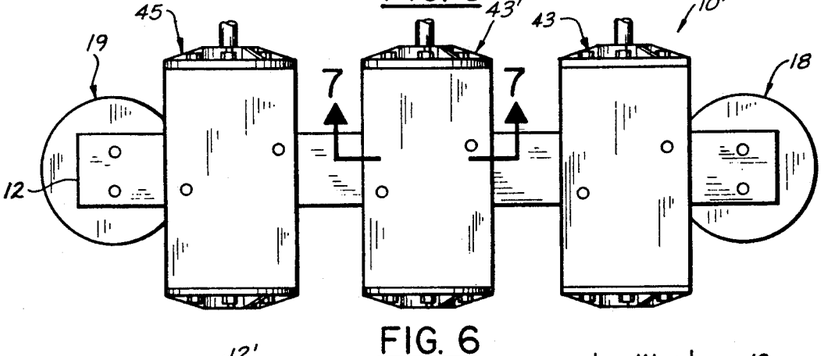

Referring also to FIGS. 5 and 6, in order to add a self-propelled feature to the lawn mower 50, a third motor assembly indicated at 43' similar to the motor assemblies 43 and 45 is centrally interposed between the magnetic pole pieces 12 and 14. The drive shaft of the motor assembly 43' is similarly extended downwardly through the motor platform 52 and connected with a selected drive train, such as belts and pulleys or gears, not shown, for angularly rotating the forward or rearward wheels of the lawn mower 50.

Magnetic flux from the coils 18 and 19 centrally concentrating in opposition between the respective pole pieces 12 and 14 and motor assemblies 43 and 45 provides ample magnetic flux for driving the armature of the motor assembly 43'.

Figure 19:
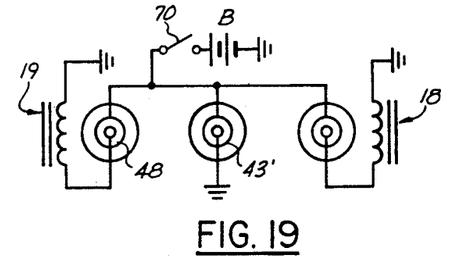
FIGS. 19 and 20 are wiring diagrams for the motor illustrated by FIGS. 5 and 6.

The wiring diagram for the self-propelled mower motor 10' is exactly the same as the wiring diagram of FIG. 11 for the commutators 46 and 48 and coils 18 and 19, respectively. The commutator of the motor assembly 43' is connected direct to ground from the on/off control switch 70 (FIG. 19).

Figure 20:
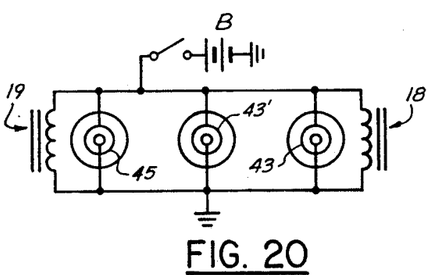

FIG. 20 illustrates an alternative embodiment of the wiring diagram for the motor 10' in which the DC potential is connected to ground in parallel through the commutators of the respective motor assembly 43, 43', and 45 and the coils 18 and 19 resulting in increased torque and armature rpm.

Figure 9:
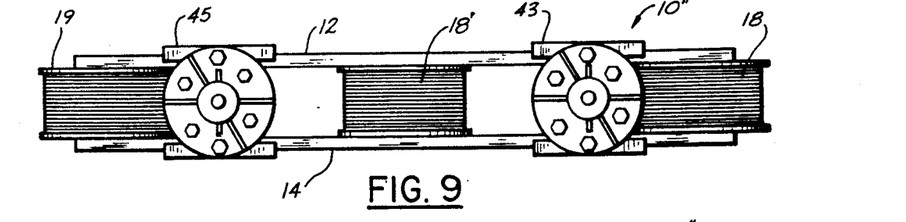
FIGS. 9 and 10 are views similar to FIGS. 1 and 2, respectively, illustrating a third coil interposed between the armatures.
Figure 10:
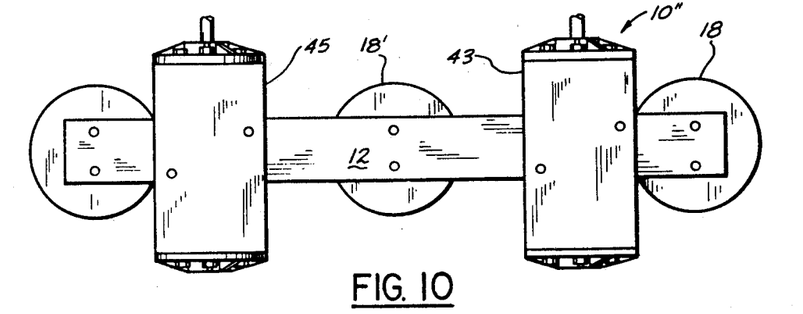
Figure 21:
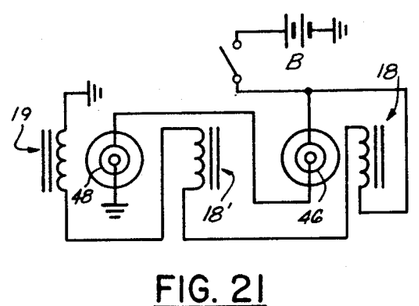
FIGS. 21 and 22 are wiring diagrams for the motor illustrated by FIGS. 9 and 10.

Referring more particularly to FIGS. 9 and 10, a third embodiment of the motor is indicated at 10" and features a third coil assembly 18', identical to either of the coils 18 or 19 centrally interposed between the magnetic pole pieces 12 and 14. The added third coil 18' further increases the magnetic flux in the pole pieces 12 and 14 and connecting the battery potential to ground in series through the respective coil 18, 18' and 19, as in FIG. 21 and to ground in series through the commutators 46 and 48 results in a free-running low amperage drag motor in which the amperage drag increases with load.

Figure 22:
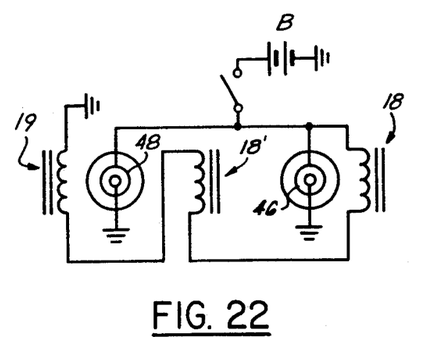

The motor 10" may be utilized as a high torque and low amperage drag motor by connecting the battery potential to ground in parallel through the commutators 46 and 48 and to ground in series through the coils 18, 18' and 19 (FIG. 22).

Figure 23:
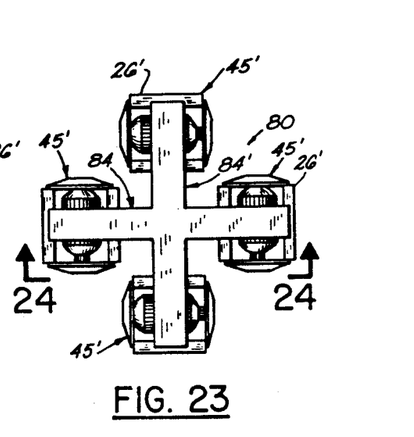
FIG. 23 is a top view of another DC motor embodiment.
Figure 24:
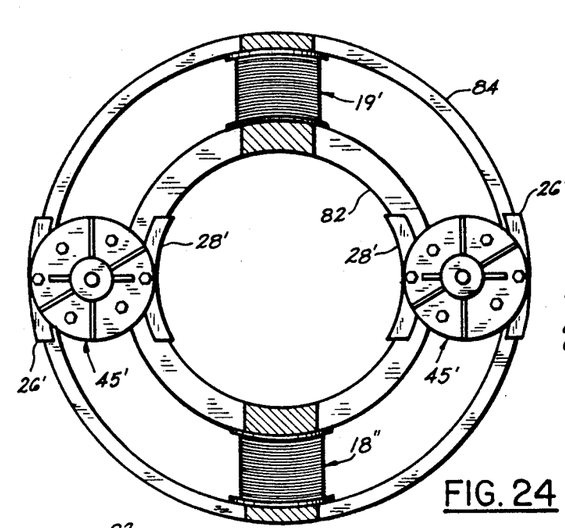
FIG. 24 is a vertical cross sectional view, mostly in elevation, taken substantially along the line 24—24 of FIG. 23.

Referring now more particularly to FIGS. 23 and 24, a circular array of the motor assembly is illustrated at 80 which is formed by two pairs of endless inner and outer concentric pole pieces, respectively integrally connected in crossed relation. Transversely each endless pole piece is substantially equal to the transverse width of the pole pieces 12 and 14 and the spacing therebetween is substantially equal to the spacing between the pole pieces 12 and 14. The respective inner pole piece 82, only one being shown, is provided with additional thickness so that the mass of the inner and outer pole pieces 82, 84 and 84' are, respectively, substantially equal for reasons well understood by those familiar with direct current magnetic motors.

A pair of coils, indicated at 18"; and 19' including coil cores extending between the inner and outer pole pieces at their respective intersections, substantially identical with respect to the coil assemblies 18 and 19, and in diametric opposition between the respective pairs of pole pieces. The central area within the innermost pole pieces is referred to as a "calm area" or "eye" of the motor assembly 80 when not more than two coils are disposed between the pairs of pole pieces 82, 84 and 84'.

Similarly, a pair of motor assemblies 45' substantially identical with respect to the motor assembly 45 with the exception of its housing plates 26' and 28' which are arcuately curved transversely to cooperate with the circular arc of the respective pole piece and support the respective armature shaft of the respective motor assembly 45' in diametric opposition and spaced 90° from the respective coil.

Obviously either pair of the crossed pairs of endless concentric pole pieces of FIG. 23 may be expanded as a multi-motor assembly.

Figure 25:
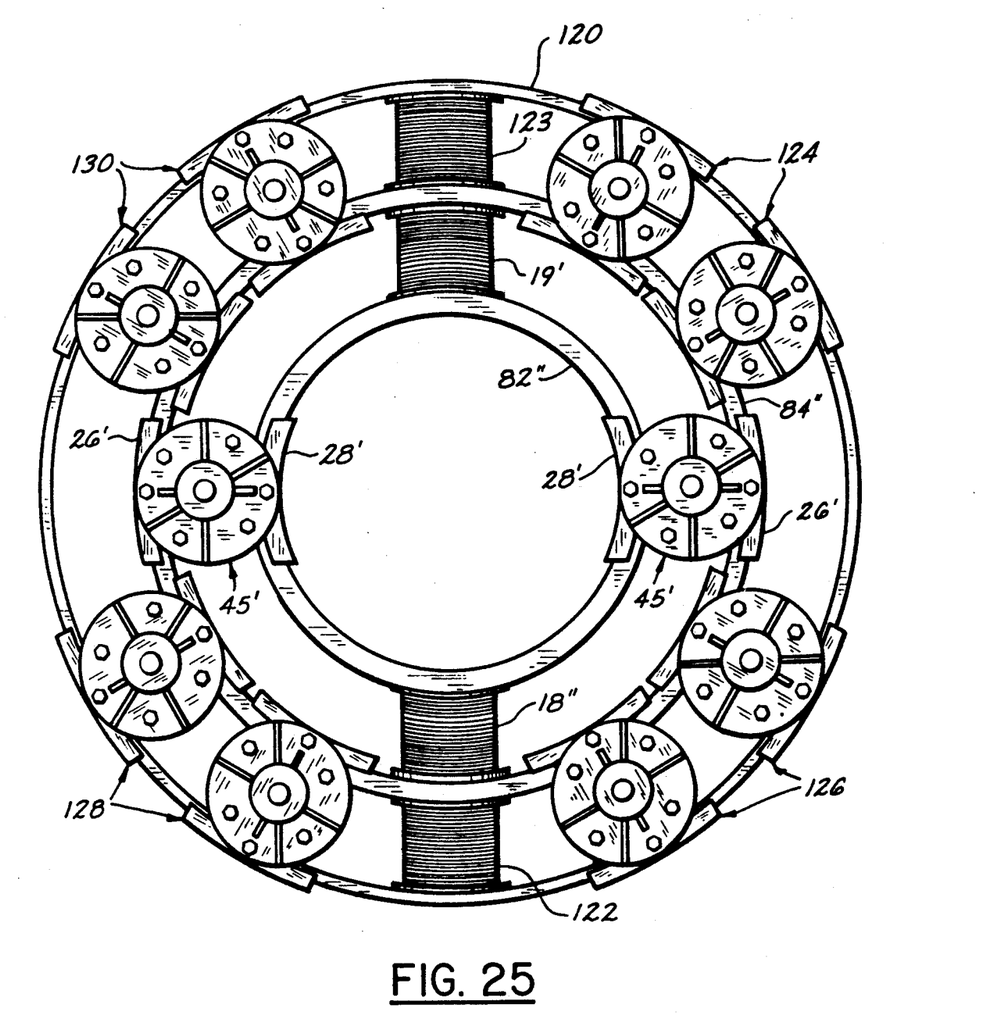
FIG. 25 is a side view of another DC motor embodiment.

FIG. 25 illustrates an example of such a motor in which the inner and outer concentric pole pieces 82" and 84" are connected in similar spaced-apart relation by the coils 18" and 19' and a pair of the motor assemblies 45' are disposed in diametric opposition spaced 90° from the respective coil 18" and 19'. This motor assembly comprising the inner and outer concentric rings 82" and 84", coils 18" and 19' and a pair of motor assemblies 45' can be further expanded outwardly by adding a third endless pole piece 120 concentric with the pole pieces 82" and 84" and radially spaced from the outer pole piece 84" a distance substantially equal to the spacing between the pole pieces 82" and 84".

The outer pole piece 120 is rigidly connected with the pole piece 84" by additional coils 122 and 123 identical with the coils 18" and 19' and respectively positioned in diametric alignment therewith.

A plurality of pairs of motor assemblies 124, 126, 128 and 130 is interposed between the pole piece 84" and outer pole piece 120 in a manner similar to that described hereinabove for the motors 45'.

Figure 26:
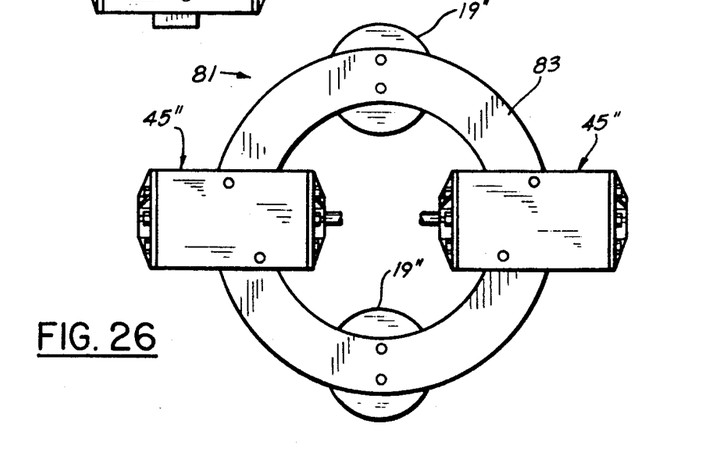
FIG. 26 is a top view of another DC motor embodiment.

Referring now more particularly to FIG. 26, a circular array of the motor assembly is illustrated at 81 which is formed by a pair of endless pole pieces 83, only one being shown. Transversely each pole piece 83 is substantially equal to the transverse width of the pole pieces 12 and 14 and the spacing therebetween is substantially equal to the spacing between the pole pieces 12 and 14.

A pair of coils, indicated at 19" including coil cores extending between the respective inner and outer pole pieces substantially identical with respect to the coil assembly 19, are positioned in diametric opposition between the pole pieces 83.

Similarly, a pair of motor assemblies 45" substantially identical with respect to the motor assembly 45 support the respective armature shaft of the respective motor 45".

Obviously additional coils and/or motor assemblies may be interposed between the pole pieces of the motors 80 and 81 (FIGS. 23–26) for particular motor requirements. The wiring diagram of these endless pole piece motors is substantially identical with the diagrams of FIGS. 11–18.

Another version of the three armature motor is indicated at 86 (FIG. 27) in which the pole pieces 88 and 90 are similar to the pole pieces 12 and 14 and respectively receive between their respective end portions, a pair of motor assemblies 92, respectively identical with the motor assemblies 43 and 45.

Figure 27:
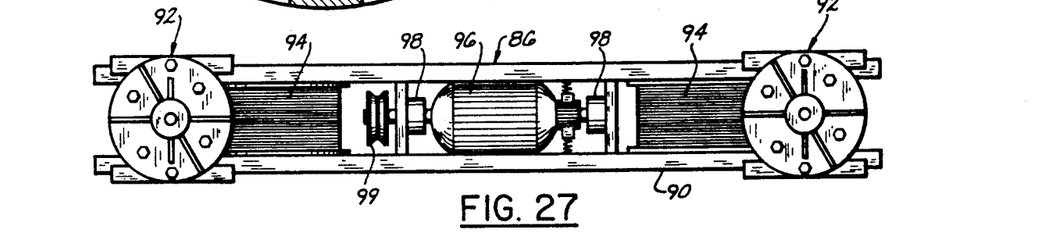
FIG. 27 is a top view of another DC motor embodiment.

A pair of coils 94, each having a coil core, not shown, are interposed between the pole pieces 88 and 90 adjacent, but inwardly of the respective motor assembly 92. Between these two coils 94, a third armature 96 is longitudinally interposed between the pole pieces 88 and 90 with its shaft in axial alignment with the longitudinal axis of the pole pieces 88 and 90. The shaft of the armature 96 is journalled at its respective end portions by suitable diamagnetic bearing supports 98, extending between and secured to the pole pieces 88 and 90. A pulley or sprocket 99 may be connected with the drive shaft end of the armature 96.

Figure 28:
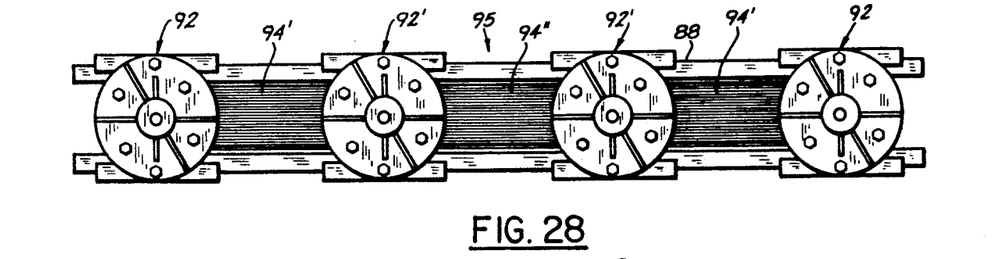
FIG. 28 is a top view of another DC motor embodiment.

Another motor version similar to the motor 86 is indicated at 95 (FIG. 28) in which the central armature is omitted and additional motor assemblies indicated at 92' are interposed in spaced apart relation between the coils 94'. A third coil 94" is interposed between the central pair of motor assemblies 92'.

Figure 29:
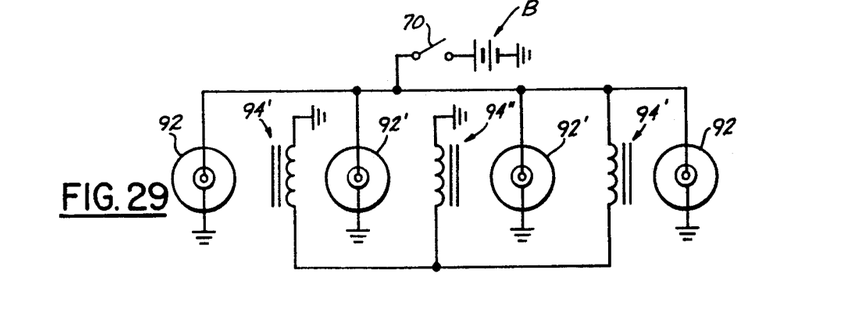
FIG. 29 is a wiring diagram for the motor illustrated by FIG. 27.

As illustrated by FIG. 29, the battery potential is connected to ground in parallel through the commutators of the motor assemblies 92 and 92' and to ground through the parallel connection of the coil 94" and one coil 94' and in series through the other coil 94'. With the motor 95 wired in this manner the outboard motor assemblies (or all of the motor assemblies) may be utilized as generators.

All of the above motors in which a coil is interposed between elongated parallel pole pieces generate an excess of magnetic flux forming opposing polarity magnetic pole pieces in which remote ends of the magnetic pole pieces contain sufficient normally unused magnetic flux to drive one or more additional motor assemblies.

As briefly mentioned hereinabove, the wire forming the coil, wound around a square or rectangular pole piece forms a coil perimeter with four opposing sides and at each position of the wire extending from the plane of one of the coil sides to an adjacent side forms a "corner portion" of the coil in which the magnetic "working" flux may drive the armature of a motor assembly.

Figure 30:
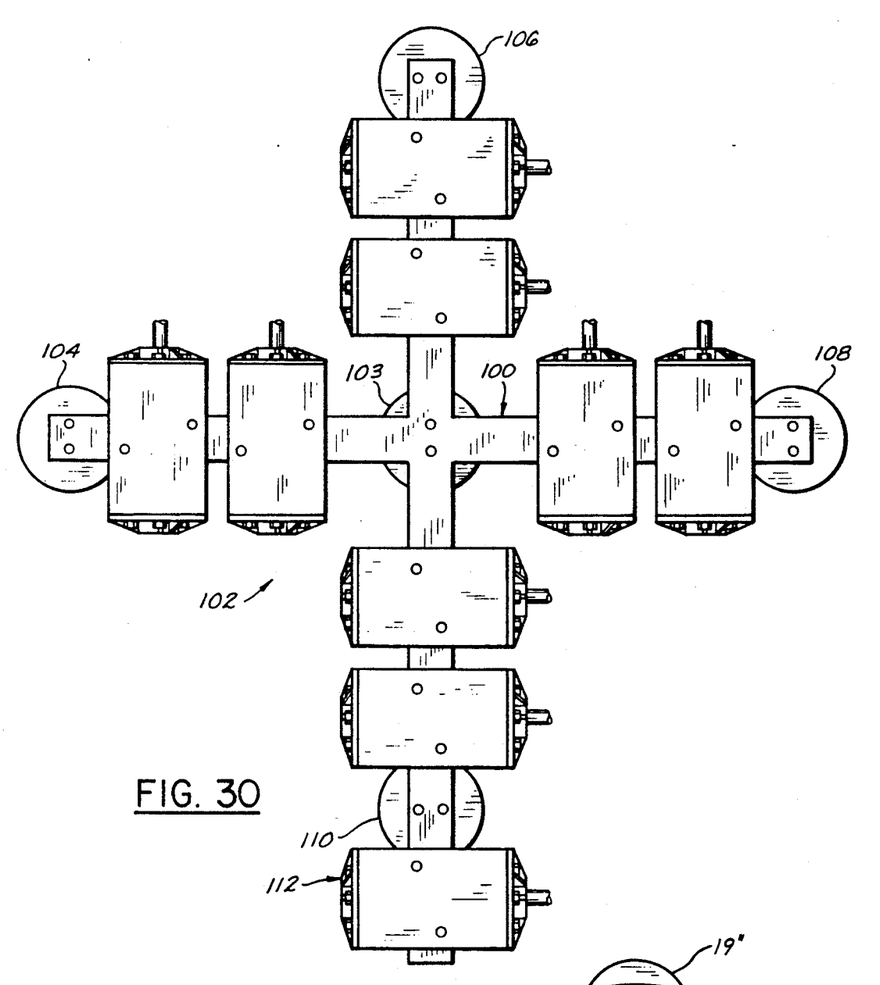
FIG. 30 is a top view of a further embodiment of DC motors.

FIG. 30 illustrates this feature in which a pair of pole pieces 100 are integrally joined in right angular crossed relation, only one being shown, are disposed in parallel superposed relation to form a multi-armature motor assembly, indicated at 102, which includes a central coil 103 and outboard coils 104, 106 and 108 at each of three of its remote pole piece end portions of the cross shape disposed outwardly of dual armature motor assemblies, similar to the motor 10.

The fourth arm of the cross shape similarly supports dual armature motor assemblies inboard of a fourth coil 110 with an additional motor assembly 112 disposed outwardly of the coil 110.

Thus it may be seen that additional armature motor assemblies may be extended indefinitely, if space permits, from each of the arm end portions or "open ends" of the magnetic crossed pole pieces or at any "corner portion" of a DC coil.

Similarly additional planar pole pieces may be added in over or under lying relation to the planar pole piece motors or adding circular pole pieces to the circular motor (FIGS. 23–26) and interposing coils and motor assemblies between the added and original pole piece as needed for particular applications.

Obviously the invention is susceptible to changes or alterations without defeating its practicability. Therefore, I do not wish to be confined to the preferred embodiment shown in the drawings and described herein.

I claim:

1. A DC motor assembly, comprising:

a pair of strap-like magnetizable metallic members disposed in parallel spaced-apart relation;

coil means between and connected said members for forming a pair of magnetic pole pieces, each magnetic pole of said pair of pole pieces having a north and a south pole, said coil means comprising, a rectangular coil core having opposing end surfaces abutting confronting surfaces of said pair of pole pieces adjacent their respective end portions and having opposite planar side surfaces parallel with the longitudinal side and end surfaces, respectively, of said pole pieces;

at least one wire wound around said coil cores in a manner defining a like plurality of coil magnetic flux generating substantially planar surfaces disposed in a like plurality of planes normal to each other and the planes of the adjacent confronting surfaces of each pole piece of said pair of pole pieces;

each pole piece of said pair of pole pieces having a transverse concave recess adjacent the respective said coil means disposed in confronting opposition with a like cooperating concave recess in the opposite pole piece;

first and second armatures each having a predetermined winding span transversely disposed in parallel spaced-apart relation between said pole pieces in axial alignment with the pole piece confronting recesses and forming a fine air gap between a peripheral portion of the respective armature and the surface defining the adjacent concave recess in the respective said pole piece of said pair of pole pieces, the width of the respective recess longitudinaly of each pole piece of said pair of pole pieces being substantially one-half the winding span of the respective armature;

diamagnetic housing means for operatively supporting said armatures between said pair of pole pieces;

a source of DC potential;

primary circuit means including parallel primary wiring respectively connecting the DC potential to ground in series through one said armature and an adjacent said coil for generating magnetic flux influence from opposing directions in the respective pole pieces of said pair of pole pieces and in diametric opposition on the respective armature; and, electrical current control means including first switch means interposed in said primary wiring for selectively controlling the direction of rotation, angular rate of rotation, torque and amperes of one said armature relative to the other said armature.

2. The motor assembly according to claim 1 in which the radial dimension of the fine air gap is not less than 0.015" or greater than 0.025" (0.04 to 0.06 cm).

3. The motor assembly according to claim 1 in which the respective pole piece of the pair of magnetic pole pieces are strap-like and further include:

a second pair of strap-like pole pieces having the respective pole piece of the second pair of pole pieces transversely intersecting intermediate its ends in coplanar angular relation the respective pole piece of the first named pair of pole pieces intermediate their respective ends; and, other armatures interposed between said first and said second pairs of pole pieces.

4. The motor assembly according to claim 1 and further including:

secondary circuit means including secondary wiring and a second switch means connecting the DC potential to ground in parallel through said coils for doubling the magnetic flux influence on said armatures and doubling the torque of the armatures.

5. A DC motor assembly, comprising:

a pair of endless strap-like magnetizable members disposed in coaxial spaced-apart relation;

coil means between and connected in diametric opposition with said members for forming a pair of opposite polarity magnetic pole pieces, each said coil means comprising, a rectangular coil core having opposing end surfaces abutting confronting surfaces of said pair of pole pieces and having opposite planar side surfaces normal to the confronting surfaces, respectively of said pole pieces;

at least one wire wound around said coil cores in a manner defining a like plurality of coil magnetic flux generating substantially planar surfaces disposed in a like plurality of planes normal to each other and the adjacent confronting surfaces of each pole piece of said pair of pole pieces;

each pole piece of said pair of pole pieces having a transverse concave recess angularly spaced from the respective said coil means and disposed in confronting opposition with a like cooperating concave recess in the opposite pole piece;

first and second armatures each having a predetermined winding span transversely disposed in parallel diametric opposition between said pole pieces in axial alignment the with pole piece confronting recesses and forming a fine air gap between a peripheral portion of the respective armature and the surface defining the adjacent concave recess in the respective said pole piece of said pair of pole pieces, the width of the respective recess cicumferentially of each pole piece of said pair of pole pieces being substantially one-half the winding span of the respective armature;

nonmagnetic housing means for operatively supporting said armatures between said pair of pole pieces;

a source of DC potential;

primary circuit means including parallel primary wiring respectively connecting the DC potential to ground in series through one said armature and an adjacent said coil for generating magnetic flux influence from opposing directions in the respective pole piece of said pair of pole pieces and in diametric opposition on the respective armature; and, electrical current control means including first switch means interposed in said primary wiring for selectively controlling the direction of rotation, angular rate of rotation, torque and amperes of one said armature relative to the other said armature.

6. The motor assembly according to claim 5 and further including:

secondary circuit means including secondary wiring and a second switch means connecting the DC potential to ground in parallel through said coils for doubling the magnetic flux influence on said armatures and doubling the torque of the armatures.

7. The motor assembly according to claim 5 in which the respective pole piece of the pair of magnetic pole pieces is endless strap-like and concentric with the other pole piece and further including:

a second pair of endless concentric strap-like pole pieces having the respective pole piece of the second pair of pole pieces transversely diametrically intersecting in coplanar angular relation the respective pole piece of the first named pair of pole pieces; and, other armatures interposed between said second pair of endless concentric pole pieces.

8. The motor assembly according to claim 5 in which the respective pole piece of the pair of magnetic pole pieces is endless strap-like and concentric with the other pole piece and further including:

a third endless strap-like pole piece concentrically surrounding said pair of endless concentric pole pieces in radially spaced relation;

other coil means interposed between and connecting said third pole piece with the outermost pole piece of said pair of concentric pole pieces; and, additional armatures interposed between said third pole piece and the outermost pole piece of said pair of concentric pole pieces.

* * * * *